April 27, 1943.   J. R. TONEY   2,317,652

ELECTRIC EYE CURB INDICATOR

Filed April 28, 1941   2 Sheets-Sheet 1

INVENTOR.
JOHN RAY TONEY
BY
*William E. Hall*
ATTORNEY.

April 27, 1943. J. R. TONEY 2,317,652
ELECTRIC EYE CURB INDICATOR
Filed April 28, 1941 2 Sheets-Sheet 2

INVENTOR.
JOHN RAY TONEY.
BY
William B Hall
ATTORNEY.

Patented Apr. 27, 1943

2,317,652

UNITED STATES PATENT OFFICE 2,317,652

ELECTRIC EYE CURB INDICATOR

John Ray Toney, Los Angeles, Calif.

Application April 28, 1941, Serial No. 390,695

6 Claims. (Cl. 177—311)

My present invention relates to means to facilitate the parking of vehicles, and particularly to an electric eye for the detection of the proximity of the vehicle to curbs, and other objects. This application is a continuation in part of my co-pending application for Means to facilitate parking of vehicles, filed October 1, 1940, Serial No. 359,225.

One of the principal objects of this invention is to provide an indicator of this class which may be observed by the driver of the vehicle while in the driver's seat, for indicating the proximity of the vehicle to a curb or the like, and which at no time will have any protruding parts or appendages to interfere with the normal progress of the vehicle in any way, and which will in no way detract from its appearance.

Another important object of this invention is to provide means of this class for indicating the proximity of either end or any portion of the vehicle from a curb or other object.

Still another important object of this invention is to provide indicating means of this class having certain leeway or range of variation between which the means will indicate the approximate distance of the vehicle from such curb or other object.

A further important object of this invention is to provide an indicator of this class which is so constructed and arranged that the electric eye or photo-electric cell may not be readily interfered with by illuminating means other than that provided on the vehicle.

A still further important object of this invention is to provide an indicator of this class which will operate equally as well during the day as at night.

An object also of this invention is to provide means of this class which is simple and economical to construct, install and operate proportionate to its functions, and which will not readily deteriorate or get out of order.

With these and other objects in view, as will appear hereinafter, I have devised an electric eye curb indicator having certain novel features of construction, combination, and arrangement of parts and portions, as will be hereinafter described in detail and particularly set forth in the appended claims, reference being had to the accompanying drawings and to the characters of reference thereon, which form a part of this application, in which:

Figure 1:
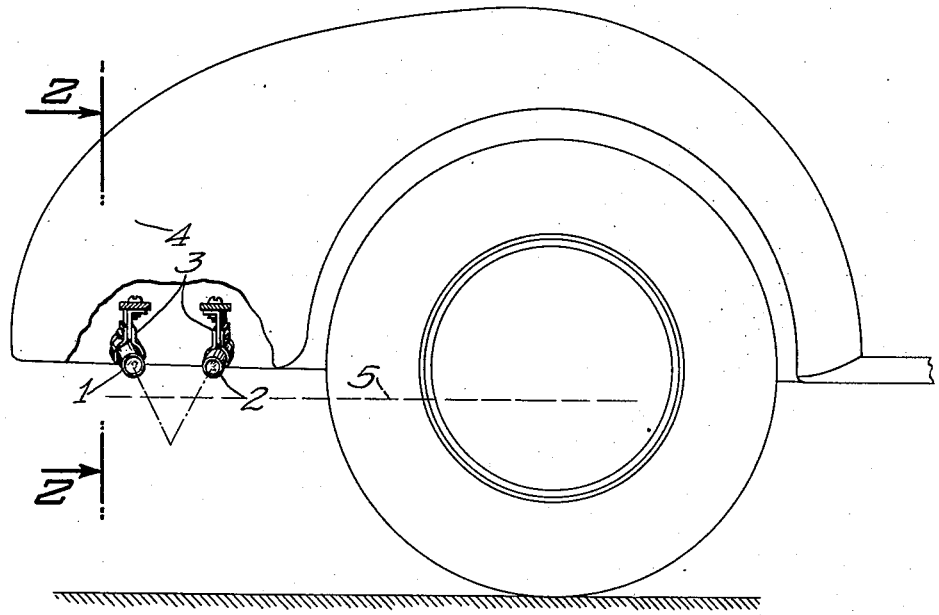
Fig. 1 is an elevation of the rear end of the side of an automobile, showing a portion of my curb indicator installed thereon.
Figure 2:
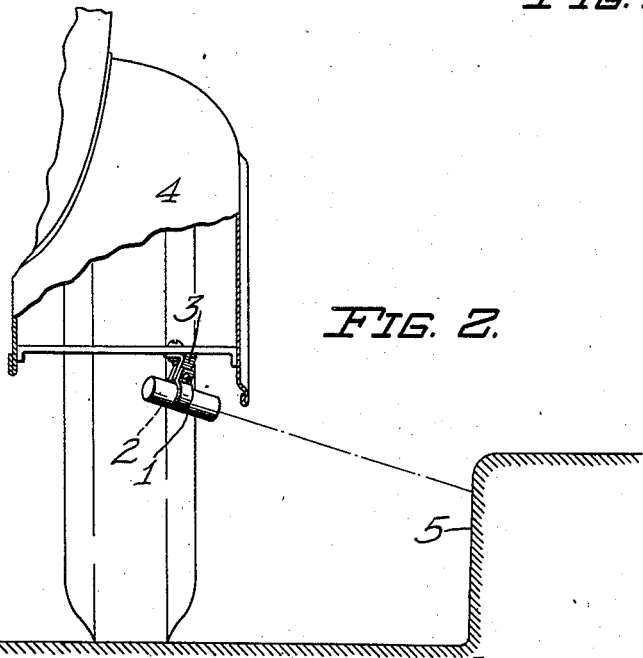
Fig. 2 is a sectional elevation thereof, taken from the rear of the automobile and substantially on the line 2—2 of Fig. 1, and showing its relation to a curb at the side of the road.

One detecting unit of my apparatus is intended to be installed at the front and another at the rear portion of the side of the vehicle. Such installation may be provided at the right side only, since automobiles are usually parked with the curb at the right side.

Each detaching unit consists of a light house or light beam producing and directing means 1, and a photo-electric cell 2.

The means 1 may consist of a housing $1^a$, at one end of which is located an electric bulb $1^b$, and at the opposite end of which is a lens $1^c$.

The photo-electric cell may be enclosed in a casing $2^a$, at one end of which are the usual photo-electric cell elements $2^b$. At the opposite or outer end is a lens $2^c$, and intermediate the cell elements and the lens is also located a screen or diaphragm $2^d$ with a small axial aperture. The members 1 and 2 are mounted on a suitable bracket 3 which is supported by the fenders 4 of the automobile, one unit being supported on the front, and another on the rear fender. These members 1 and 2 are preferably so mounted that they are concealed behind or underneath the fenders or other elements of the automobile, but they are preferably so mounted that the light beam is directed below the edge of the fender.

The axes of the lamp-house and beam-directing means and that of the photo-electric cell are also directed downwardly so that the lamp-house and photo-electric cell may be hidden from view and be protected, and still so located that their respective beams may be directed low enough to illuminate and detect a curb.

The principal function of my curb detector is this: When the light beam from the lamp-house illuminates a small portion of a curb, such illuminating of a specific portion of the curb is picked up by the photo-electric cell, and such fact is registered on the instrument board.

The beam or pencil of light emanating from the house or beam directing means is indicated as bounded by diverging lines A and B, and the light which affects or energizes the photo-electric cell is limited to or included between lines C and D diverging from the photo-electric cell. The outer lines A and D of the two diverging pencils intersect at E, indicating the greatest distance from the vehicle at which the curb, or other object, is to be detected; and the intersection of the inner lines B and C at F is the least distance from the vehicle at which the curb, or other object, is to be detected. The numeral 5 designates the curb at approximately the middle position and is shown at the intersection of the axes of the lamp-house and the photo-electric cell.

Figure 3:
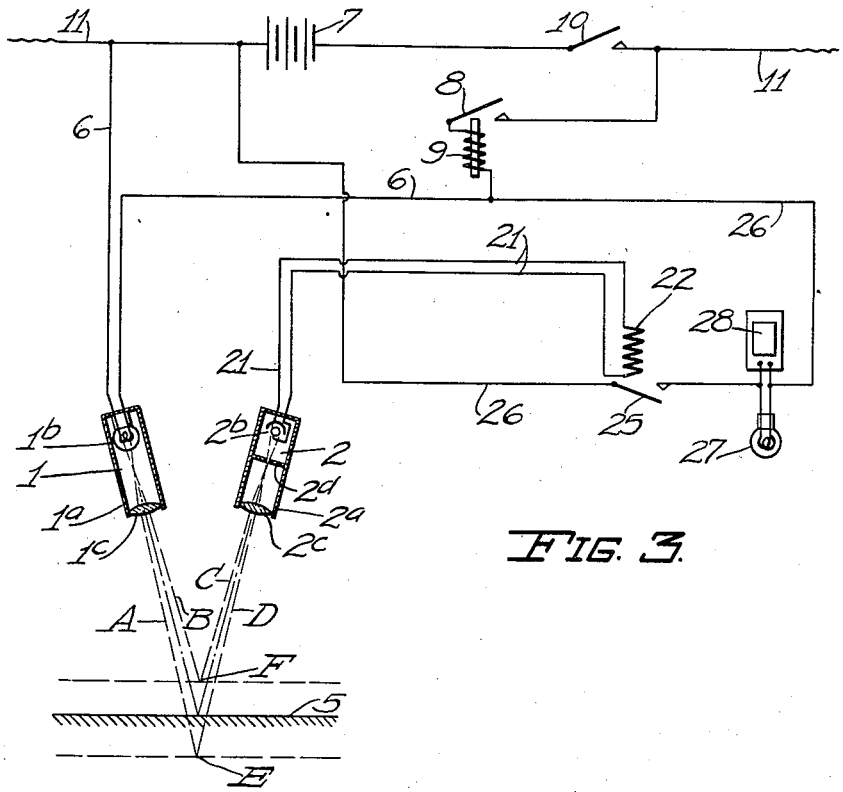
Fig. 3 is a diagrammatic view in plan, showing the relation of the light-beam-directing means and the photo-electric cell to the curb, the presence of which is to be indicated to the driver of the vehicle; and, Fig. 4 is a diagrammatic view of my apparatus, showing the indicating means at the forward and rear portions of a vehicle.

In Fig. 3, which shows only a single indicator, the lamp-house or light beam producer and director are included in the circuit 6, in which is a battery 7 and switch 8. The latter is located within easy reach of the driver.

The switch 8 is preferably an electro-magnetic switch which is held closed when depressed, but which may be opened manually or when the electrical energy to the controlling magnet is shut off. The electro-magnet referred to is designated 9 and is connected in series in the circuit 6. In this circuit is also connected the main or ignition switch 10, which connects the ignition circuit 11 to the battery.

When the ignition switch is open, the electro-magnet 9 is de-energized, allowing the switch 8 to spring open. Thus, the curb detecting means is disconnected when the motor is shut off.

The photo-electric cell 2 has a circuit 21 in which is inserted a moving coil relay or galvanometer relay 22. This relay has a switch 25 for completing a circuit 26 in which a suitable electrical signal means is connected. This signal means may be a light 27, or buzzer 28, or both, as shown in the drawings. These may be located on the instrument board of the vehicle.

It will be understood that instead of the galvanometer relay 22 and the switch 25 in connection therewith, an ordinary electro-magnetic switch may be employed. But such substitution would necessitate an amplifier in the circuit.

Figure 4:
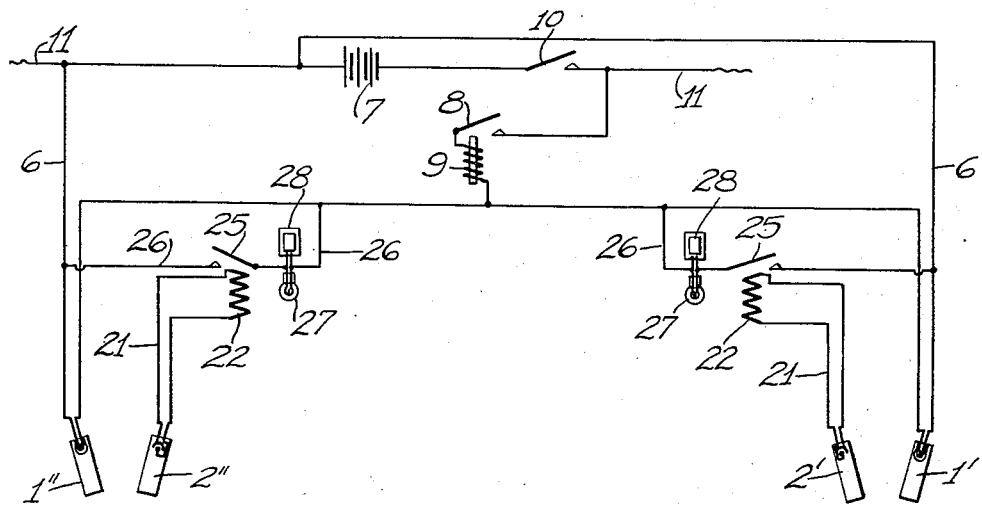

Fig. 4 shows a wiring diagram for curb detecting means at the front and rear portions of the vehicle. In this diagram, the lamp house and photo-electric cell on the front fender are designated 1' and 2', respectively, while those on the rear fender are designated, respectively, 1" and 2". In this system all parts are duplicated except the battery 7, initiating switch 8, the holding electro-magnet 9, and the ignition switch 10. The signal means may be sufficiently different to determine from the driver's seat the spacing of either or both ends of the vehicle from the curb.

It will be understood that numerous adjustments may be provided for varying the size of the beam of light, that is, the angle of divergence between the rays A and B, and also the size of the effective light beam entering the photo-electric cell. The angular positions of the lamp-house and photo-electric cell may be adjusted to vary the point or portion of intersection of the axes of these two elements. The downward angle may also be varied as desired. Such adjustments are all obvious to those skilled in the art.

I have referred specifically to the angle between the axis of the photo-electric cell and the beam or axis of the light ray from the lamp-house, and have used such term in the appended claims. By "angle," I specifically mean an angle which is greater than zero (0) and less than a straight angle.

Specific reference has been made to a beam of light which is produced by or directed outwardly from a vehicle. The word "light" is intended to include all rays of the spectrum, both visible and invisible.

Though I have shown and described a particular construction, combination, and arrangement of parts and portions of my curb indicator, and a particular application thereof to vehicles and the nearness or proximity thereof to curbs or other objects, I do not wish to be limited to the same, but desire to include in the scope of my invention the construction, combination, and arrangement substantially as set forth in the appended claims.

I claim:

1. In a curb indicator, the combination with a vehicle, of means carried by the vehicle for directing a beam of light to the side of the vehicle for illuminating a restricted area on a curb, a photo-electric cell also carried by the vehicle and having its axis positioned at an angle to and intersecting the beam, and signal means on the vehicle in the circuit of the photo-electric cell for indicating the presence of the illuminated area on the curb when said area appears at the intersection of the beam and the axis of the photo-electric cell.

2. In a curb indicator, the combination with a vehicle, of means carried by the vehicle for directing a beam of light to the side of and downwardly from the vehicle for illuminating a restricted area on a curb, a photo-electric cell also carried by the vehicle and also having its axis directed downwardly and positioned at an angle to and intersecting the beam, and signal means on the vehicle in the circuit of the photo-electric cell for indicating the presence of the illuminated area on the curb when said area appears at the intersection of the beam and the axis of the photo-electric cell.

3. In a curb indicator, the combination with a vehicle, means on the vehicle for directing a beam of light to the side of the vehicle for illuminating a restricted area on a curb, a photo-electric cell mounted on the vehicle and spaced from the light-beam-directing means longitudinally with respect to the axis of the vehicle, the axis of the photo-electric cell being capable of intersecting said beam of light, and signal means on the vehicle in the circuit of the photo-electric cell for indicating the presence of the illuminated area on the curb when said area appears at the intersection of the beam of light and the axis of the photo-electric cell.

4. In a curb indicator of the class described, the combination with a vehicle, of means for directing a light beam to the side of the vehicle for illuminating the curb contiguous to the side of the vehicle, and means on the vehicle for indicating to the driver of the vehicle the distance of the curb, in the path of the light beam, from the vehicle, the light beam of the first means and the axis of the second means being positioned at such an angle relative to each other that they substantially intersect at the surface of the curb when the vehicle is a predetermined distance from the curb.

5. In a curb indicator, the combination with a vehicle having a fender near one end of its side, of a light source mounted on and within the lateral contour of the vehicle below the fender thereon, said source being substantially concealed from view from the outer side of the vehicle, said source being arranged to direct a beam of light to the side of and downwardly from the vehicle below the fender, and a photoelectric cell also mounted on and within the lateral contour of the vehicle below said fender, said cell being also substantially concealed from view from the outer side of the vehicle, the light beam and axis of the cell being positioned at such an angle relative to each other that they intersect at the surface of the curb when the light responsive cell and light source, carried on said vehicle, are a predetermined distance from said curb.

6. In a curb indicator, the combination with a vehicle having a fender near one end of its side, of a light source mounted on and within the lateral contour of the vehicle below the fender thereon, said source being substantially concealed from view from the outer side of the vehicle, said source being arranged to direct a beam of light to the side of and downwardly from the vehicle below the fender, and means on the vehicle for indicating to the driver of the vehicle the distance of the vehicle from a curb in the path of the light beam, the light beam of said source and the axis of the means being positioned at such an angle relative to each other that they substantially intersect at the surface of the curb when the vehicle is a predetermined distance from the curb, said means being also mounted on and within the lateral contour of the vehicle below said fender and substantially concealed from view from the outer side of the vehicle.

JOHN RAY TONEY.